(12) United States Patent  
Sheridan et al.

(10) Patent No.: US 10,161,409 B2  
(45) Date of Patent: Dec. 25, 2018

(54) FAN DRIVE GEAR SYSTEM INCLUDING A TWO-PIECE FAN SHAFT WITH LUBRICANT TRANSFER LEAKAGE RECAPTURE

(71) Applicant: United Technologies Corporation, Farmington, CT (US)

(72) Inventors: William G. Sheridan, Southington, CT (US); Karl D. Blume, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 238 days.

(21) Appl. No.: 15/105,118

(22) PCT Filed: Nov. 25, 2014

(86) PCT No.: PCT/US2014/067303  
§ 371 (c)(1),  
(2) Date: Jun. 16, 2016

(87) PCT Pub. No.: WO2015/102779  
PCT Pub. Date: Jul. 9, 2015

(65) Prior Publication Data  
US 2016/0319830 A1  Nov. 3, 2016

Related U.S. Application Data

(60) Provisional application No. 61/921,791, filed on Dec. 30, 2013.

(51) Int. Cl.  
*F01D 25/18* (2006.01)  
*F16H 57/04* (2010.01)  
(Continued)

(52) U.S. Cl.  
CPC ........... *F04D 29/063* (2013.01); *F01D 25/18* (2013.01); *F01D 25/183* (2013.01); *F01M 11/02* (2013.01);  
(Continued)

(58) Field of Classification Search  
CPC .......... F04D 29/00–29/708; F16H 1/28; F16H 57/0427; F16C 2360/23; F16C 23/045;  
(Continued)

(56) References Cited

U.S. PATENT DOCUMENTS 2,591,743 A   4/1952   Thompson  
2,684,591 A   7/1954   Lundquist  
(Continued)

FOREIGN PATENT DOCUMENTS

JP   60252857   12/1985  
JP   61130656   6/1986  
JP   62166365   7/1987

OTHER PUBLICATIONS

European Search Report for EP Application No. 14877520.8 dated Nov. 13, 2017.

(Continued)

*Primary Examiner* — Ramya P Burgess  
*Assistant Examiner* — Lillian T Nguyen  
(74) *Attorney, Agent, or Firm* — Carslon, Gaskey & Olds, P.C.

(57) ABSTRACT

A disclosed fan drive gear system for a gas turbine engine includes a first fan shaft coupled to a second fan shaft, a first shaft support bearing assembly disposed about the first fan shaft and a second shaft support bearing assembly disposed about the second fan shaft. A planetary gear system is coupled to the second fan shaft. A transfer bearing is configured to receive lubricant from a lubricant input and is positioned between the first and second fan shaft support (Continued)

bearings. A second bearing is configured to rotate with the second fan shaft and receive lubricant from the transfer bearing and communicate lubricant to at least one lubricant passage and a conduit fluidly connecting the at least one lubricant passage to the planetary gear system.

23 Claims, 4 Drawing Sheets (51) Int. Cl.
  F04D 29/063 (2006.01)
  F01M 11/02 (2006.01)
  F04D 25/02 (2006.01)
  F04D 29/054 (2006.01)
  F04D 29/056 (2006.01)
  F04D 29/64 (2006.01)
  F02C 7/36 (2006.01)

(52) U.S. Cl.
  CPC ......... F04D 25/028 (2013.01); F04D 29/054 (2013.01); F04D 29/056 (2013.01); F04D 29/644 (2013.01); F02C 7/36 (2013.01); F05B 2220/302 (2013.01); F05B 2260/40311 (2013.01); F05D 2260/40311 (2013.01); F05D 2260/98 (2013.01)

(58) Field of Classification Search
  CPC .... F02C 7/36; Y02T 50/672; Y10T 29/49245; F05B 2260/4031; F05B 2220/302; F01D 25/18–25/183
  See application file for complete search history.

(56) References Cited

U.S. PATENT DOCUMENTS

| | | |
|---|---|---|
| 2,703,021 A | 3/1955 | Stoeckicht |
| 2,749,778 A | 6/1956 | Kuhn |
| 2,830,473 A | 4/1958 | Brown |
| 2,883,885 A | 4/1959 | Upton |
| 2,968,922 A | 1/1961 | Gilbert |
| 3,160,026 A | 12/1964 | Rosen |
| 3,307,433 A | 3/1967 | Bennett et al. |
| 3,352,178 A | 11/1967 | Lindgren et al. |
| 3,459,072 A | 8/1969 | Shannon |
| 3,650,353 A | 3/1972 | Abbott |
| 3,754,484 A | 8/1973 | Roberts |
| 3,776,067 A | 12/1973 | DeBruyne et al. |
| 3,892,306 A | 7/1975 | Bertaud |
| 3,960,029 A | 6/1976 | Eichinger |
| 4,050,544 A | 9/1977 | Kalyan et al. |
| 4,227,427 A | 10/1980 | Dick |
| 4,271,928 A | 6/1981 | Northern |
| 4,378,711 A | 4/1983 | Daniel |
| 4,438,663 A | 3/1984 | Eichenberger et al. |
| 4,455,888 A | 6/1984 | Wayman et al. |
| 4,467,670 A | 8/1984 | Kawamoto |
| 4,528,870 A | 7/1985 | Van Deursen et al. |
| 4,583,413 A | 4/1986 | Lack |
| 4,657,410 A | 4/1987 | Hibner |
| 4,784,018 A | 11/1988 | Okada et al. |
| 4,950,213 A | 8/1990 | Morisawa |
| 5,058,452 A | 10/1991 | El-Shafei |
| 5,102,379 A | 4/1992 | Pagluica et al. |
| 5,433,674 A | 7/1995 | Sheridan et al. |
| 5,466,198 A | 11/1995 | McKibbin et al. |
| 5,472,059 A | 12/1995 | Schlosser et al. |
| 5,472,383 A | 12/1995 | McKibbin |
| 5,643,126 A | 7/1997 | Hotta et al. |
| 5,685,797 A | 11/1997 | Barnsby et al. |
| 5,830,098 A | 11/1998 | Kimes |
| 6,223,616 B1 | 5/2001 | Sheridan |
| 7,704,178 B2 | 4/2010 | Sheridan et al. |
| 8,484,942 B1 | 7/2013 | McCune et al. |
| 2003/0122438 A1* | 7/2003 | Winkel ................. F04D 29/263 310/112 |
| 2008/0044276 A1 | 2/2008 | McCune et al. |
| 2008/0112798 A1 | 5/2008 | Seitzer et al. |
| 2009/0090096 A1 | 4/2009 | Sheridan |
| 2010/0154217 A1 | 6/2010 | Sheridan et al. |
| 2010/0160105 A1 | 6/2010 | Sheridan et al. |
| 2010/0180571 A1 | 7/2010 | Zysman et al. |
| 2012/0088624 A1 | 4/2012 | Sheridan |
| 2012/0192570 A1 | 8/2012 | McCune et al. |
| 2012/0216545 A1 | 8/2012 | Sennoun et al. |
| 2012/0277055 A1* | 11/2012 | Sheridan ................. F01D 25/16 475/331 |

OTHER PUBLICATIONS

International Search Report and Written Opinion for PCT Application No. PCT/US2014/067303 dated Mar. 13, 2015.
International Preliminary Report on Patentability for PCT Application No. PCT/US2014/067303 dated Jul. 14, 2016.

* cited by examiner

FAN DRIVE GEAR SYSTEM INCLUDING A TWO-PIECE FAN SHAFT WITH LUBRICANT TRANSFER LEAKAGE RECAPTURE

CROSS REFERENCE TO RELATED APPLICATION

This application claims priority to U.S. Provisional Application No. 61/921,791 filed on Dec. 30, 2013.

BACKGROUND

A gas turbine engine typically includes a fan section, a compressor section, a combustor section and a turbine section. Air entering the compressor section is typically compressed and delivered into the combustion section where it is mixed with fuel and ignited to generate a high-speed exhaust gas flow. The high-speed exhaust gas flow typically expands through the turbine section to drive the compressor and the fan section.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The fan section includes a plurality of fan blades mounted to a hub supported by bearings for rotation about the engine axis. The hub is coupled to an output of the geared architecture. The bearings require lubricant that is supplied through lubricant passages. The geared architecture also requires lubricant. The structures required for communicating lubricant to the bearings and geared architecture can complicate assembly and require additional space.

Although geared architectures have improved propulsive efficiency, turbine engine manufacturers continue to seek further improvements to engine performance including improvements to thermal, transfer and propulsive efficiencies.

SUMMARY

A lubrication system according to an exemplary embodiment of this disclosure, among other possible things includes a transfer bearing configured to receive a lubricant from a lubricant input, a second bearing configured to rotate with a fan drive shaft, the transfer bearing engages the second bearing disposed between two fan shaft support bearings and is configured to transfer lubricant from the transfer bearing to the second bearing and into at least one lubricant passage, and a conduit fluidly connected to the at least one lubricant passage and configured to deliver lubricant to at least one component of a fan drive gear system.

In a further embodiment of any of the foregoing lubrication systems, includes a first race on the transfer bearing configured to transfer lubricant to a first opening in registration with the at least one lubricant passage.

In a further embodiment of any of the foregoing lubrication systems, the second bearing includes a portion of a fan drive shaft and the at least one lubricant passage is defined within the fan drive shaft.

In a further embodiment of any of the foregoing lubrication systems, the second bearing includes a portion of the fan drive shaft and a lubricant manifold is attached for rotation with the fan drive shaft and includes the at least one lubricant passage.

In a further embodiment of any of the foregoing lubrication systems, includes a feed tube supplying lubricant to the transfer bearing. The feed tube extends through an opening in a spacer defining a desired spacing between two fan drive shaft support bearings.

In a further embodiment of any of the foregoing lubrication systems, includes at least one fastener securing at least one of the two fan drive shaft support bearings in position. The at least one fastener includes a scoop for catching and directing lubricant to one of the two fan drive shaft support bearings.

In a further embodiment of any of the foregoing lubrication systems, the two fan drive shaft support bearings include tapered bearings.

In a further embodiment of any of the foregoing lubrication systems, the two fan drive shaft support bearings include roller bearings.

In a further embodiment of any of the foregoing lubrication systems, the two fan drive shaft support bearings include ball bearings.

In a further embodiment of any of the foregoing lubrication systems, the transfer bearing and the second bearing are disposed about a rotational axis.

In a further embodiment of any of the foregoing lubrication systems, the conduit is parallel to the rotational axis.

A fan drive gear system for a gas turbine engine according to an exemplary embodiment of this disclosure, among other possible things includes a first fan shaft coupled to a second fan shaft. A first shaft support bearing assembly is disposed about the first fan shaft and a second shaft support bearing assembly disposed about the second fan shaft. A planetary gear system is coupled to the second fan shaft. A transfer bearing is configured to receive lubricant from a lubricant input engaged to the fan shaft between the first shaft support bearing assembly and the second shaft support bearing assembly. A second bearing is configured to rotate with the second fan shaft and receive lubricant from the transfer bearing and communicate lubricant to at least one lubricant passage. A conduit fluidly connects the at least one lubricant passage to the planetary gear system.

In a further embodiment of any of the foregoing systems, includes a first race on the transfer bearing configured to transfer lubricant to the at least one lubricant passage.

In a further embodiment of any of the foregoing systems, includes a carrier supporting rotation of a plurality of planet gears and the second shaft includes a torque shaft attached to the carrier.

In a further embodiment of any of the foregoing systems, the at least one lubricant passage is defined within the torque shaft.

In a further embodiment of any of the foregoing systems, includes a lubricant manifold attached to the second shaft and defining the at least one lubricant passage.

In a further embodiment of any of the foregoing systems, includes a spacer between the first shaft support bearing assembly and the second shaft support bearing assembly.

In a further embodiment of any of the foregoing systems, includes a feed tube extending through the spacer to the transfer bearing.

In a further embodiment of any of the foregoing systems, includes a first nut holding the first shaft support bearing in place and a second nut holding the second shaft support bearing in place. Each of the first nut and the second nut includes a scoop for catching and directing lubricant to a corresponding one of the first and second shaft support bearings.

A method of assembling a fan drive gear system according to an exemplary embodiment of this disclosure, among other possible things includes attaching a torque shaft to a component of a fan drive gear system, assembling a first shaft support bearing to the torque shaft and securing the first shaft support bearing with a first fastener, assembling a transfer bearing to the torque shaft for communicating lubricant to at least one lubricant passage, coupling a hub shaft to the torque shaft, and assembling a second shaft support bearing to the hub shaft and securing the second shaft support bearing with a second fastener spaced apart from the first shaft support bearing.

In a further embodiment of any of the foregoing methods, includes assembling a conduit for transferring lubricant from the at least one lubricant passage to the component of the fan drive gear system.

In a further embodiment of any of the foregoing methods, includes attaching a lubricant manifold to the torque shaft including the at least one lubricant passage.

In a further embodiment of any of the foregoing methods, the component of the fan drive gear system includes a carrier supporting rotation of a plurality of planetary gears driven by a sun gear and circumscribed by a ring gear.

In a further embodiment of any of the foregoing methods, each of the first fastener and the second fastener includes a scoop and the assembly of each of the fasteners comprises aligning the scoop relative to the transfer bearing for enabling capture and transfer of lubricant to a corresponding one of the first shaft support bearing and the second shaft support bearing.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
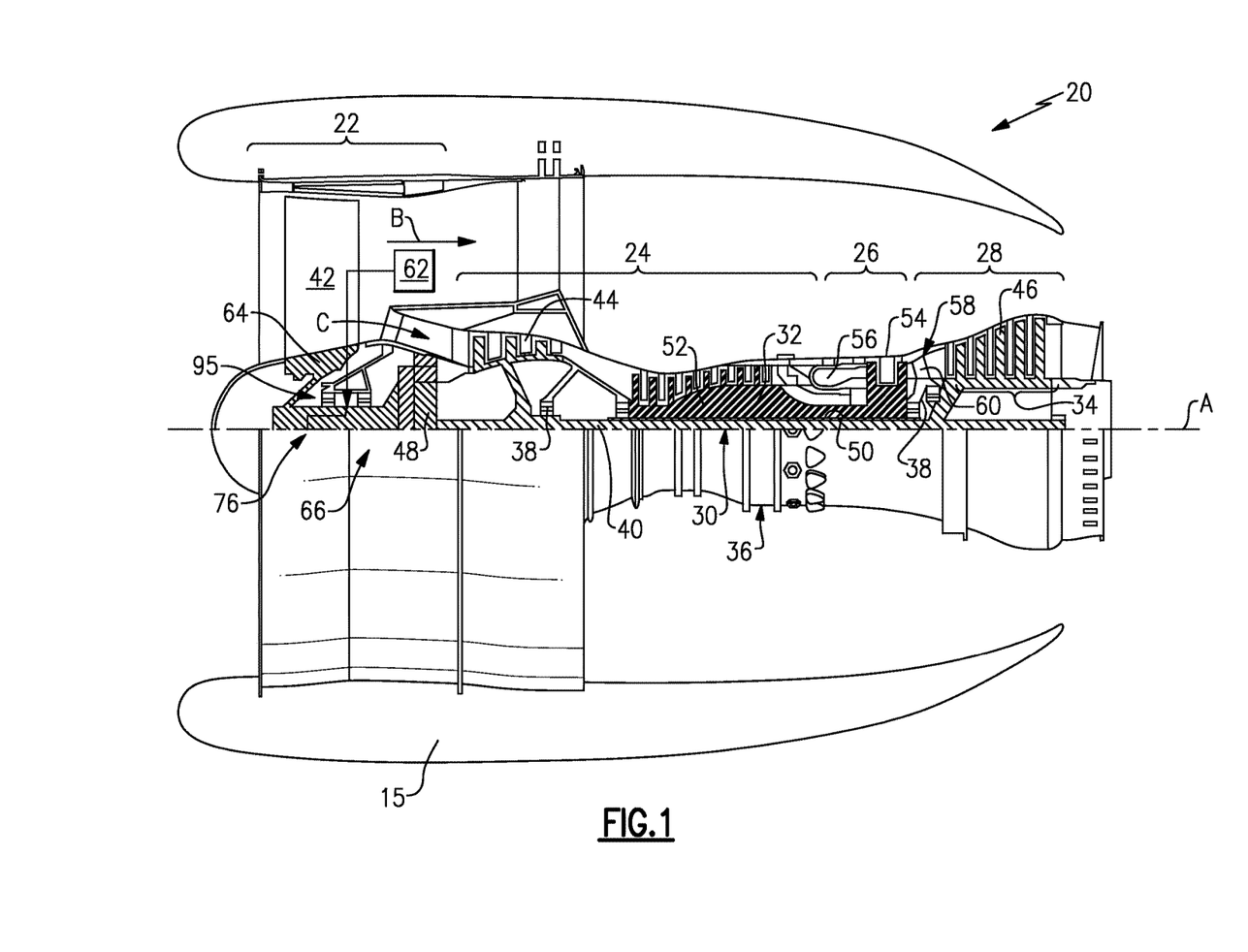
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15 while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow through the core flow path C is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A fan drive gear system 66 of the example gas turbine engine 20 includes the geared architecture 48 and a shaft assembly 76. A lubrication system 62 supplies lubricant to the geared architecture 48 and to a bearing system 95 that supports rotation of the shaft assembly 76. In this example, a fan hub 64 is part of the shaft assembly 76. The shaft assembly 76 includes two parts and is coupled to the geared architecture 48 to drive the fan hub 64 and thereby the plurality of fan blades 42 about the axis A.

Figure 2:
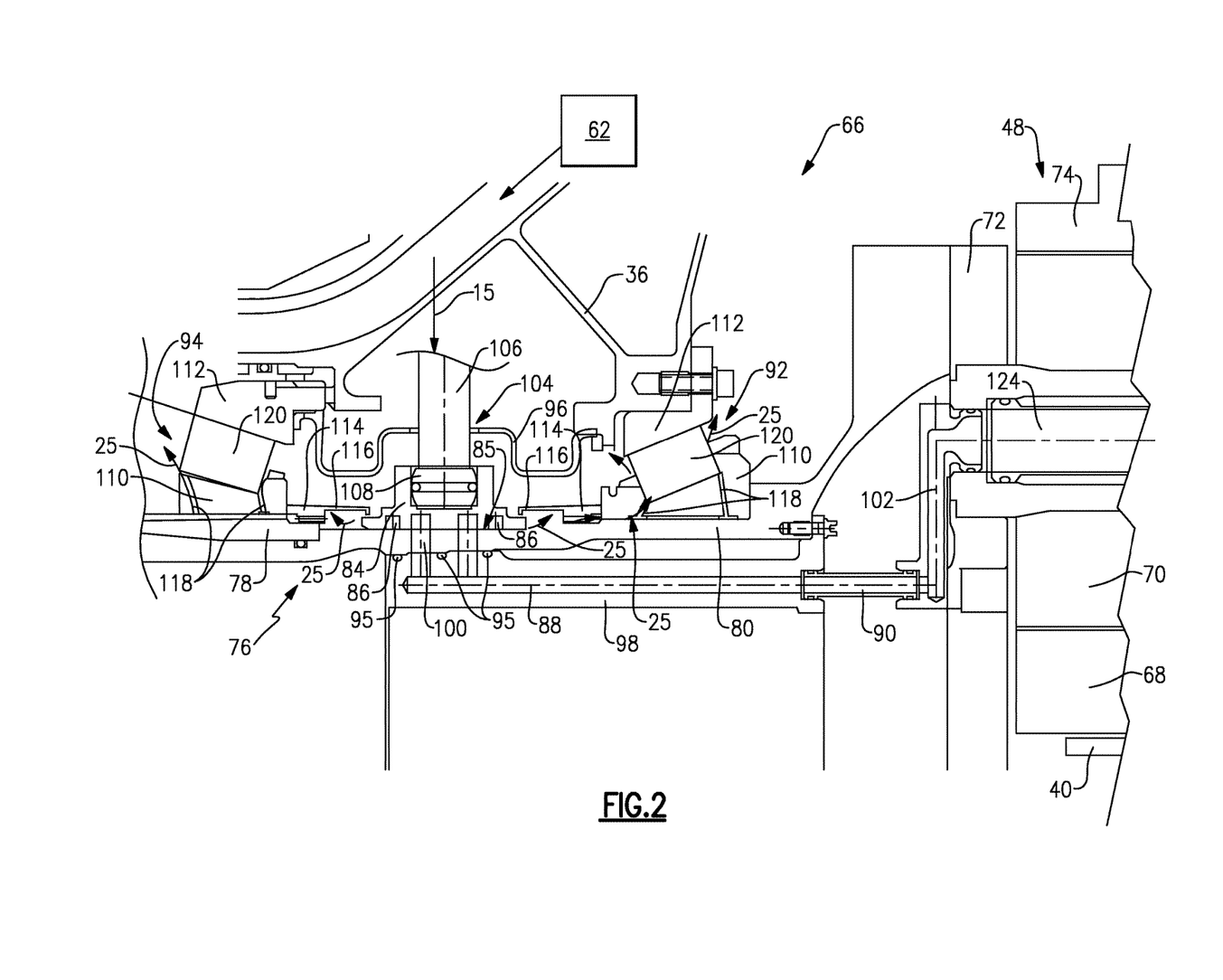
FIG. 2 is a schematic view of a lubrication system for a fan drive gear system of a gas turbine engine.

Referring to FIG. 2 with continued reference to FIG. 1, the fan drive gear system 66 is provided lubricant from the lubricant system 62. The example geared architecture 48 includes a sun gear 68 that is driven by the inner shaft 40. The sun gear 68 in turn drives intermediate gears 70 that are supported within a carrier 72. The intermediate gears 70 are in turn engaged to a ring gear 74 that circumscribes the plurality of intermediate 70. Each of the intermediate gears 70 is supported on a journal bearing 124 that requires lubricant. Moreover, the geared architecture 48 requires lubricant to various portions to maintain desired power transfer efficiency.

Lubrication is supplied from the lubricant system 62 to a feeder tube 106. The feed tube 106 supplies lubricant to a stationary lubricant transfer bearing assembly 84. The transfer bearing assembly 84 communicates lubricant to a second bearing 85. In this example, the second bearing 85 is an outer surface of a portion of the fan shaft assembly 76. The lubricant transfer bearing assembly 84 includes carbon seals 86 that engage the rotating second bearing 85 of the shaft assembly 76.

In this example, the shaft assembly 76 includes a hub shaft 78 and a torque shaft 80. The torque shaft 80 in this example is coupled to the carrier 72 to transfer rotational output from the geared architecture 48.

The example fan shaft assembly 76 is supported by a first fan drive shaft support bearing assembly 92 and a second fan drive shaft support bearing assembly 94. The example transfer bearing assembly 84 is disposed between the first and second fan drive shaft support bearing assembles 92 and 94. The bearing assemblies 92 and 94 support rotation of the fan shaft assembly 76.

Each of the fan drive support bearing assemblies 92, 94 includes an inner race 110 that rotates with a corresponding portion of the fan shaft assembly 76. Each of the fan shaft support bearing assemblies 92, 94 includes outer races 112 supported on an engine static structure 36. The bearing assemblies 92 and 94 are spaced apart by a spring spacer 96. The spring spacer 96 defines the spacing between the first bearing 92 and the second bearing 94 and provides a preload on the bearings assemblies 92 and 94.

The spring spacer 96 includes an opening 104 through which the feed tube 106 extends. The feed tube 106 includes a seal head portion 108 that fits within the transfer bearing assembly 84. The transfer bearing assembly 84 includes openings that correspond with passages 100 through the torque shaft 80. The openings 100 communicate lubricant 15 supplied from the lubricant supply system 62 through the feed tube 106 to an intermediate lubricant passage 88. As appreciated, in this example, a single lubricant passage 88 is shown. However, a plurality of passages 88 may be utilized to communicate lubricant to different parts of the geared architecture 48.

In this example, a lubricant manifold 98 is attached to the torque shaft 80 and rotates with the torque shaft 80 about the axis A. The example lubricant manifold includes seals 95 that seal against an interior surface of the torque shaft 80. Lubricant provided through the feed tube 106 passes through openings 100 within the torque shaft 80 to the intermediate lubricant passage 88. From the intermediate lubricant passage 88, lubricant is passed through a conduit 90 to passages 102 defined within the carrier assembly 72.

As appreciated, although the passages 102 are defined in this disclosed example within the carrier 72, the passages 102 can be within other features or structures of the geared architecture 48 to communicate lubricant to specific locations. In this example, the passage 102 communicates lubricant to the journal bearing 124 supporting rotation of a corresponding intermediate gear 70.

Each of the shaft support bearing assemblies 92, 94 are secured in place by a nut 114. Each of the nuts 114 includes a scoop 116 that directs and gathers lubricant that is exhausted from the lubricant transfer bearing assembly 84. Lubricant indicated by arrows 25 is exhausted from the interface between the transfer bearing assembly 84 and the second bearing 85 and is captured by the scoops 116.

Lubricant 25 is then transferred through passages 118 defined within the nut 114 and the inner races 110. The lubricant is passed to the corresponding tapered bearings 120 of each of the shaft support bearings 92, 94. Lubricant 25 is then exhausted from the bearing assemblies 92, 94 and recovered.

The example lubricant transfer bearing assembly 84 is disposed between the first and second support bearings 92, 94 and thereby does not require additional axial space. The reduction in axial space provides benefits in assembly and maintenance of the example gas turbine engine.

Referring to FIGS. 3A, 3B, 3C and 3D, the example lubricant transfer bearing assembly 84 includes a link 130 that attaches by way of a pin 134 to a static engine structure 36 that includes ears 136. The link 130 is attached by way of a pin 134 on a first side that includes ears 134. The link 130 is attached to a boss 138 including ears 142 on a second side by way of a ball 140 and pin 144. The ball 140 allows the lubricant transfer bearing assembly 84 to flex with the torque frame shaft 80 to accommodate misalignment and movement during operation. A plurality of feed tubes 106 are in communication with the lubricant transfer assembly 84 to supply a desired lubricant flow to different structures of the geared architecture 48.

Figure 3A:
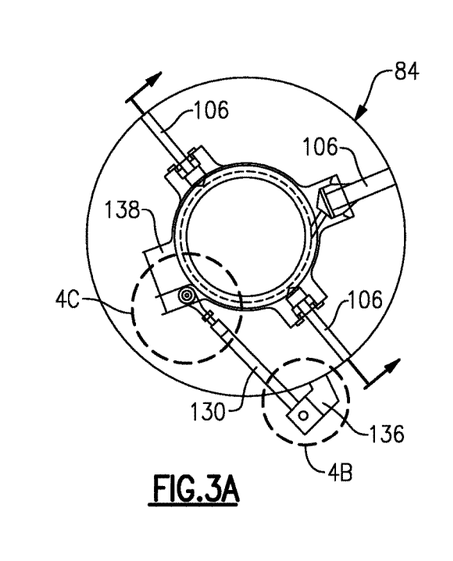
FIG. 3A is a cross-sectional view of a lubricant transfer bearing assembly.
Figure 3B:
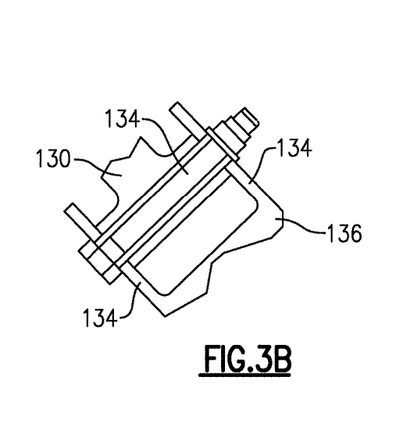
FIG. 3B is a cross-sectional view of a pinned connection of the example lubricant transfer bearing assembly.
Figure 3C:
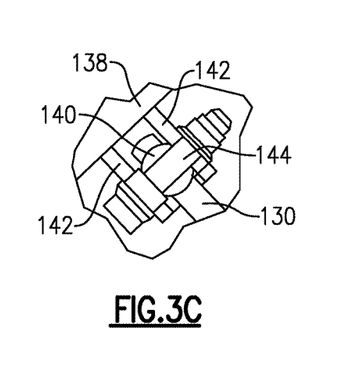
FIG. 3C is a cross-sectional view of a link connection of the example lubricant transfer bearing assembly.
Figure 3D:
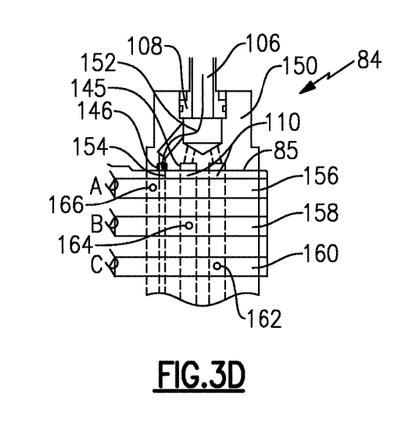
FIG. 3D is a cross-sectional view of the example lubricant transfer bearing assembly.

Referring to FIG. 3D, the example lubricant transfer bearing assembly 84 includes a housing 150 that receives the seal head 108 of the feed tube 106. The housing 150 includes passages 145, 146, 152 and 154 that communicate lubricant to the second bearing surface 85 that is defined in this example by the torque shaft 80. The torque shaft 80 includes openings 110. The example openings 110 are configured as races 156, 158 and 160. The races 156, 158 and 160 are annular grooves about the torque shaft 80 that provide for the communication of lubricant to specific passages and to specific openings 162, 164 and 166 that allow for the communication of lubricant to specific locations and different conduits 90.

Figure 4:
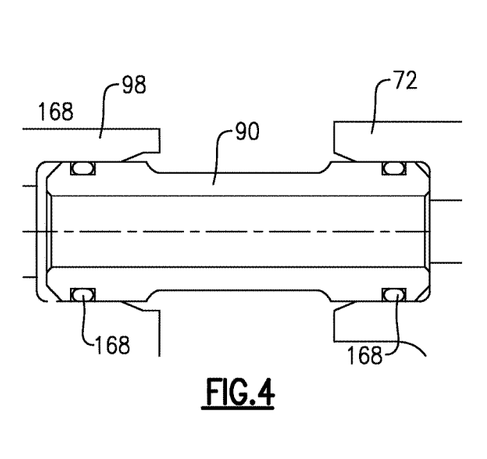
FIG. 4 is a cross-sectional view of an example lubricant conduit.

Referring to FIG. 4, the example conduit 90 is supported between the carrier 72 and the manifold 98. Each end of the conduit 90 includes seals 168 to prevent leakage. The example conduit 90 includes a spacing that accommodates relative movement due to thermal expansion and other misalignments that may occur during operation while still maintaining a desired lubricant flow path from the lubricant manifold 98 to the geared architecture 48.

Figure 5:
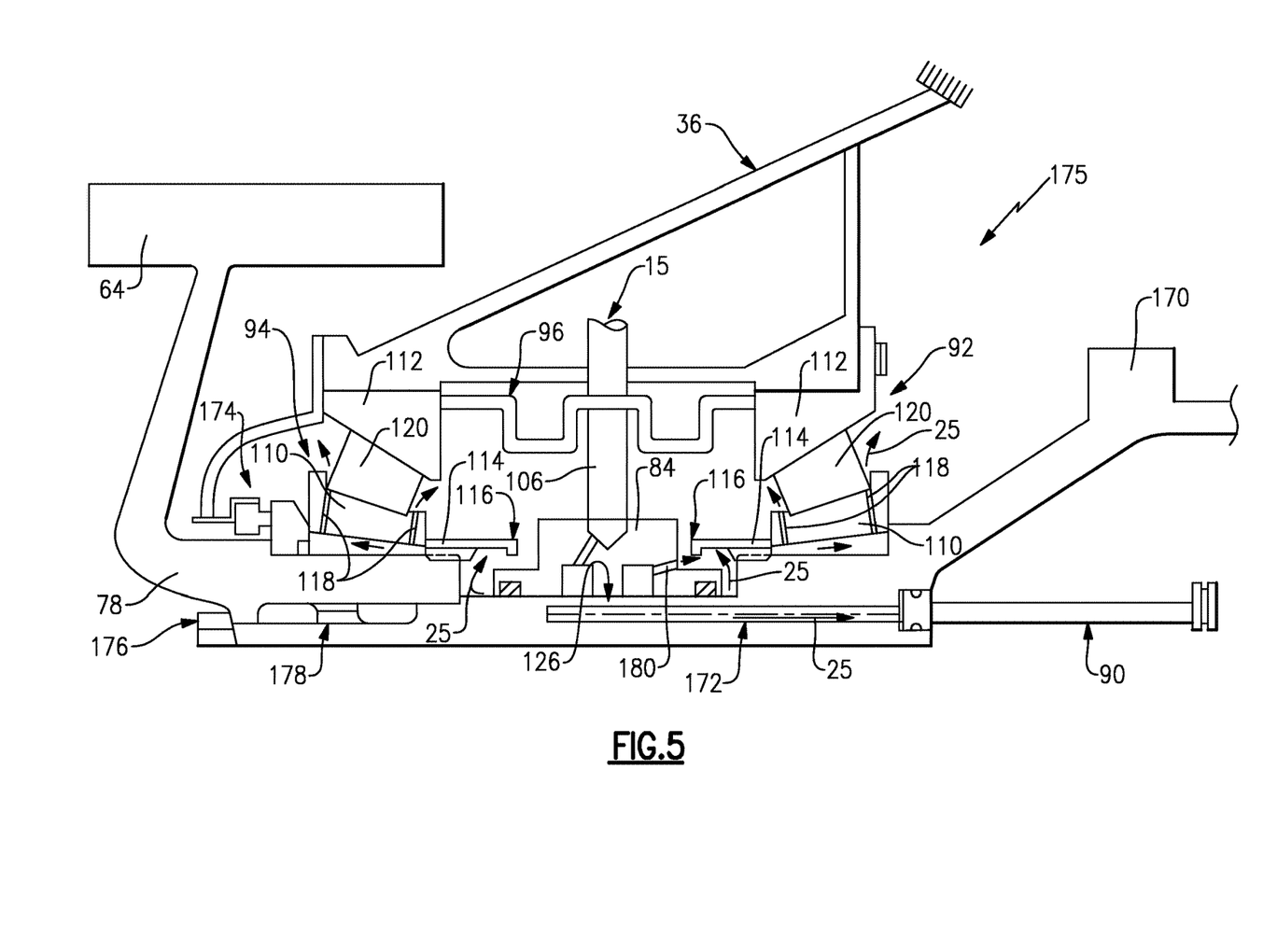
FIG. 5 is a schematic view of another lubrication system for a fan drive gear assembly.

Referring to FIG. 5, another example fan drive gear system 175 is disclosed and includes an intermediate passage 172 that is defined within the example torque shaft 170. Accordingly, a separate lubricant manifold is not utilized in this disclosed example. The example torque shaft 170 is coupled to the hub shaft 78 and defines the intermediate passage 172. The torque shaft 170 defines a second bearing surface 126 and is in communication with the lubricant transfer bearing assembly 84. The hub shaft 78 is coupled to the torque shaft 170 through a splined connection 178 and secured in place by nut 176.

Lubricant supplied through the feed tube 106 is fed through openings in the transfer bearing assembly 84 to the intermediate lubricant passage 172. This lubricant indicated by arrows 25 is then communicated to the conduit 90 and thereby to the geared architecture.

As in the previous example, each of the first and second support bearing assemblies 92, 94 includes a nut 114 within a scoop 116 to direct lubricant exhausted from the transfer bearing assembly 84. In this example, the transfer bearing assembly 84 includes a positive jet 180 that positively ejects a lubricant against the scoop 116 through passages 118 defined within the inner race 110 of each of the shaft support bearing assemblies 92, 94.

Referring to FIGS. 1 and 2, the disclosed fan drive gear system 66 enables a simplified non-blind assembly of the fan shaft assembly 76 and lubricant transfer bearing assembly 84. Assembly may be performed according to one disclosed example embodiment by attaching the torque shaft 80 to a component of the geared architecture 48. In this example, the torque shaft 80 is attached to the carrier assembly 72. Once the torque shaft 80 is attached, the first support bearing assembly 92 is assembled to the static engine structure 36 to support the torque shaft 80.

Once the first support bearing assembly 92 is assembled, the lubricant transfer bearing assembly 84 is assembled onto the outer surface of the torque shaft 80 to engage the second bearing 85 and interface with the openings 100 defined through the torque shaft 80 for communicating lubricant to the lubricant passage 88. The first bearing assembly 92 is secured in place by the nut 114 such that the scoop 116 extends adjacent to one side of the lubricant transfer bearing assembly 84 to capture lubricant expelled during operation. Assembly of the lubricant transfer bearing assembly 84 includes assembly of the feed tube 106 through the spacer spring 96. The spacer spring 96 is provided in place and the hub shaft 78 is attached to the torque shaft 80.

Assembly continues by coupling the hub shaft 78 to the torque shaft 80 through a splined connection and nut. Once the hub shaft 78 is secured to the torque shaft 80 the second shaft support bearing assembly 94 is assembled to the hub shaft 78 and spaced apart by the spring 96 from the first shaft support assembly 92. The feed tube 106 extends through the spacer 96 such that lubricant is feed to both the first and second shaft support bearing assemblies 92, 94 and the geared architecture from between the shaft support bearing assemblies.

In one example, a lubricant manifold 98 is attached to the torque shaft 80 and defines the passage 88 to the geared architecture. The method includes attaching the lubricant manifold to the torque shaft 80 and assembling the conduit 90 between the lubricant manifold 98 and the carrier 72. In another embodiment where the passage 88 is defined within the torque shaft 80, the conduit 90 is assembled between the torque shaft 170 (FIG. 5) and the carrier 72.

Accordingly, disclosed embodiments of a fan drive gear system include a two piece shaft assembly and lubrication system that eases assembly and supplies lubricant to both shaft support bearing assemblies and the geared architecture.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A lubrication system comprising:
    a transfer bearing configured to receive a lubricant from a lubricant input;
    a second bearing configured to rotate with a fan drive shaft, the transfer bearing engages the second bearing between two fan shaft support bearings and is configured to transfer lubricant from the transfer bearing to the second bearing and into at least one lubricant passage; and
    a conduit fluidly connected to the at least one lubricant passage and configured to deliver lubricant to at least one component of a fan drive gear system.

2. The lubrication system as recited in claim 1 including a first race on the transfer bearing configured to transfer lubricant to a first opening in registration with the at least one lubricant passage.

3. The lubrication system as recited in claim 1, wherein the second bearing comprises a portion of the fan drive shaft and the at least one lubricant passage is defined within the fan drive shaft.

4. The lubrication system as recited in claim 1, wherein the second bearing comprises a portion of the fan drive shaft and a lubricant manifold is attached for rotation with the fan drive shaft and includes the at least one lubricant passage.

5. The lubrication system as recited in claim 1, including a feed tube supplying lubricant to the transfer bearing, wherein the feed tube extends through an opening in a spacer defining a desired spacing between two fan drive shaft support bearings.

6. The lubrication system as recited in claim 5, including at least one fastener securing at least one of the two fan drive shaft support bearings in position, wherein the at least one fastener includes a scoop for catching and directing lubricant to one of the two fan drive shaft support bearings.

7. The lubrication system as recited in claim 5, wherein the two fan drive shaft support bearings comprise tapered bearings.

8. The lubrication system as recited in claim 5, wherein the two fan drive shaft support bearings comprise roller bearings.

9. The lubrication system as recited in claim 5, wherein the two fan drive shaft support bearings comprise ball bearings.

10. The lubrication system as recited in claim 1, wherein the transfer bearing and the second bearing are disposed about a rotational axis.

11. The lubrication system as recited in claim 1, wherein the conduit is parallel to the rotational axis.

12. A fan drive gear system for a gas turbine engine comprising:
a first fan shaft coupled to a second fan shaft;
a first shaft support bearing assembly disposed about the first fan shaft and a second shaft support bearing assembly disposed about the second fan shaft;
a planetary gear system coupled to the second fan shaft;
a transfer bearing configured to receive lubricant from a lubricant input engaged to the first, fan shaft, the transfer bearing disposed axially—between the first shaft support bearing assembly and the second shaft support bearing assembly;
a second bearing configured to rotate with the second fan shaft and receive lubricant from the transfer bearing and communicate lubricant to at least one lubricant passage; and
a conduit fluidly connecting the at least one lubricant passage to the planetary gear system.

13. The system as recited in claim 12, including a first race on the transfer bearing configured to transfer lubricant to the at least one lubricant passage.

14. The system as recited in claim 12, including a carrier supporting rotation of a plurality of planet gears and the second shaft comprises a torque shaft attached to the carrier.

15. The system as recited in claim 14, wherein the at least one lubricant passage is defined within the torque shaft.

16. The system as recited in claim 15, including a first nut holding the first shaft support bearing in place and a second nut holding the second shaft support bearing in place, wherein each of the first nut and the second nut includes a scoop for catching and directing lubricant to a corresponding one of the first and second shaft support bearings.

17. The system as recited in claim 12, including a lubricant manifold attached to the second shaft and defining the at least one lubricant passage.

18. The system as recited in claim 12, including a spacer between the first shaft support bearing assembly and the second shaft support bearing assembly.

19. The system as recited in claim 18, including a feed tube extending through the spacer to the transfer bearing.

20. A method of assembling a fan drive gear system comprising:
attaching a torque shaft to a component of a fan drive gear system;
assembling a first shaft support bearing to the torque shaft and securing the first shaft support bearing with a first fastener;
assembling a transfer bearing to the torque shaft for communicating lubricant to at least one lubricant passage;
coupling a hub shaft to the torque shaft;
assembling a second shaft support bearing to the hub shaft and securing the second shaft support bearing with a second fastener spaced apart from the first shaft support bearing; and
attaching a lubricant manifold to the torque shaft including the at least one lubricant passage.

21. The method of assembling the fan drive gear system as recited in claim 20, including assembling a conduit for transferring lubricant from the at least one lubricant passage to the component of the fan drive gear system.

22. The method of assembling the fan drive gear system as recited in claim 20, wherein the component of the fan drive gear system comprises a carrier supporting rotation of a plurality of planetary gears driven by a sun gear and circumscribed by a ring gear.

23. The method of assembling the fan drive gear system as recited in claim 20, wherein each of the first fastener and the second fastener includes a scoop and the assembly of each of the fasteners comprises aligning the scoop relative to the transfer bearing for enabling capture and transfer of lubricant to a corresponding one of the first shaft support bearing and the second shaft support bearing.

* * * * *

UNITED STATES PATENT AND TRADEMARK OFFICE
CERTIFICATE OF CORRECTION

PATENT NO. : 10,161,409 B2
APPLICATION NO. : 15/105118
DATED : December 25, 2018
INVENTOR(S) : William G. Sheridan and Karl D. Blume Page 1 of 1

It is certified that error appears in the above-identified patent and that said Letters Patent is hereby corrected as shown below:

In the Claims

Claim 2, Column 9, Line 1; replace "claim 1 including" with --claim 1, including--

Claim 12, Column 9, Line 45; replace "first, fan" with --first fan--

Claim 12, Column 9, Line 46; replace "axially -- between" with --axially between--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*